United States Patent [19]

Imai et al.

[11] Patent Number: 5,509,558
[45] Date of Patent: Apr. 23, 1996

[54] METAL OXIDE RESISTOR, POWER RESISTOR, AND POWER CIRCUIT BREAKER

[75] Inventors: Motomasa Imai, Chofu; Naoki Shutoh, Yokohama; Katsuyoshi Oh-Ishi, Kawasaki; Fumio Ueno, Yokohama; Hideo Ohkuma, Kawasaki; Yuji Katsumura, Kamakura; Masaki Kobayashi, Kawasaki; Toshiyuki Takahashi, Yokohama, all of Japan

[73] Assignees: Kabushiki Kaisha Toshiba; Toshiba Tungaloy Co., Ltd., both of Kawasaki, Japan

[21] Appl. No.: 275,523

[22] Filed: Jul. 15, 1994

[30] Foreign Application Priority Data

Jul. 16, 1993 [JP] Japan ................................ 5-199052
Sep. 30, 1993 [JP] Japan ................................ 5-245355

[51] Int. Cl.⁶ ........................ H01H 33/16; H01C 7/10; H01C 8/00
[52] U.S. Cl. ........................ 218/143; 338/20; 338/21; 338/225; 252/502; 252/503; 252/506
[58] Field of Search ........................ 218/143; 338/20; 338/21, 225; 252/502, 503, 506, 507, 508, 509

[56] References Cited

U.S. PATENT DOCUMENTS 4,418,327  11/1983  Palilla et al. .
5,219,494   6/1993  Ambros et al. ........................ 252/511
5,254,816  10/1993  Shutoh et al. ........................ 218/143
5,373,129  12/1994  Shutoh et al. ........................ 218/143

FOREIGN PATENT DOCUMENTS 0507517  10/1992  European Pat. Off. .
64-14166   1/1989  Japan .
4247601    9/1992  Japan .

OTHER PUBLICATIONS

Database WPI, Derwent Publications, AN 85-022142, JP-A-59 217 668, Dec. 7, 1984.

Database WPI, Derwent Publications, AN 82-36310, JP-A-57 052 101, Mar. 27, 1982.

*Primary Examiner*—Marvin M. Lateef
*Attorney, Agent, or Firm*—Oblon, Spivak, McClelland, Maier & Neustadt

[57] ABSTRACT

A metal oxide resistor for suppressing variations in resistivity in use in an atmosphere at a high temperature or humidity. Such a metal oxide resistor includes a sintered body in which carbon particles having an average grain size of 1 μm or less exist in the grain boundaries of metal oxide particles in an amount of 0.05 to 3 wt %, and electrodes formed on at least two opposing surfaces of the sintered body.

30 Claims, 4 Drawing Sheets

METAL OXIDE RESISTOR, POWER RESISTOR, AND POWER CIRCUIT BREAKER

BACKGROUND OF THE INVENTION

1. Field of the Invention

The present invention relates to a metal oxide resistor; a power resistor suitable as a fixed resistor, a variable resistor, and a resistor array, which are used in a high-voltage unit or a charge/discharge unit of a bulk capacitor or the like; and a power circuit breaker having the power resistor as a closing resistor.

2. Description of the Related Art

Generally, the resistor materials are roughly classified into metallic resistor materials, metal oxide resistor materials, and non-metallic resistor materials. Of these materials, the metal oxide resistor materials have heat resistances and energy breakdowns for absorbing a high electrical energy, which are higher than those of other materials.

Typical metal oxide resistors are disclosed in Jpn. Pat. Appln. KOKAI Publication Nos. 58-139401 and 59-217668.

Jpn. Pat. Appln. KOKAI Publication No. 58-139401 describes a carbon grain dispersion ceramic resistor having a sintered body obtained by dispersing a conductive carbon powder in an insulating aluminum oxide crystal and sintering them by a clay. This sintered body of the resistor contains 1.5 to 2.0 wt % of the carbon powder.

Jpn. Pat. Appln. KOKAI Publication No. 59-217668 describes another carbon grain dispersion ceramic resistor having a sintered body. This sintered body is obtained as follows. A carbon powder and a binder are added to an insulating inorganic material consisting of aluminum oxide, mullite, and a calcined clay. They are mixed, kneaded, and heat-treated to coat the particles of the insulating inorganic material with carbon. The carbon-coated particles are sintered as a starting material, thereby obtaining the sintered body. The sintered body of the resistor contains 1.5 to 5 wt % of a fine carbon powder having a size of 0.1 μm or less.

Figure 1:
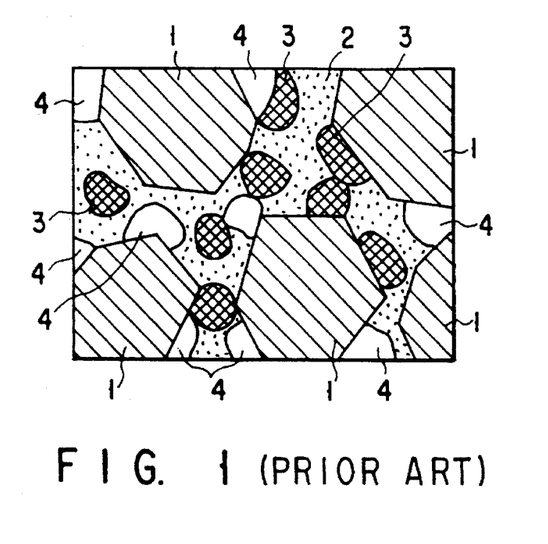
FIG. 1 is a schematic view showing the grain structure of a sintered body constituting a conventional carbon grain dispersion ceramic resistor.

Generally, when a carbon powder is added to an aluminum oxide powder, the sintering properties of the aluminum oxide are degraded. In the carbon grain dispersion ceramic resistors described in the above patent applications, since the carbon powder is added to the aluminum oxide powder, the sintering properties of the aluminum oxide are impaired. For this reason, in the above-described carbon grain dispersion ceramic resistors, after the carbon powder is added to the aluminum oxide powder, the clay is added to compensate for the sintering properties of the aluminum oxide. However, the added clay only serves to bind the aluminum oxide powder and the carbon powder. For example, a sintered body sintered by a clay has a sectional structure, as schematically shown in FIG. 1. In this sintered body, as shown in FIG. 1, a large amount of a clay 2 and carbon particles 3 exist throughout the grain boundaries of metal oxide particles 1, and voids 4 are also formed therein. Since the resistor has low denseness, i.e., a porosity of 10 to 30%, the following problems are posed.

That is, since the sintered body of the resistor has a high porosity, when the resistor is exposed at a high temperature, the carbon particles for controlling the resistance are oxidized. This causes large variations in resistance to make the resistor unusable. In addition, the sintered body of the carbon grain dispersion ceramic resistor has the nonuniformly dispersed carbon powder, as shown in FIG. 1. Therefore, it is difficult to obtain a desired resistance and a satisfactory strength.

When the resistor is used as a closing resistor of a power circuit breaker connected in parallel with a breaking connection point to absorb a surge generated during a switching operation or increase the breaking capacity, the temperature of the resistor rises significantly in accordance with heat generation caused by surge absorption because the sintered body has a high porosity, i.e., poor denseness, and its heat capacity per unit volume is as small as about 2 J/cm$^3$.deg. With an increase in temperature of the resistor, the carbon is oxidized as described above, or a defect is caused due to a thermal expansion between the sintered body and electrodes or inside the sintered body. As a result, when the carbon grain dispersion ceramic resistor is to be used as a closing resistor, a resistor with a large volume must be used to ensure the necessary heat capacity per unit volume. Therefore, a large space is required to store the resistor, resulting in a bulky circuit breaker.

SUMMARY OF THE INVENTION

It is an object of the present invention to provide a metal oxide resistor having a desired resistance whose change with time is small.

It is another object of the present invention to provide a power resistor having a desired resistance whose change with time, particularly change with time by surge absorption is small, and a large heat capacity per unit volume.

It is still another object of the present invention to provide a compact and high-performance power circuit breaker having a closing resistor unit with a large breaking capacity and stable breaking performance.

According to the present invention, there is provided a metal oxide resistor comprising:

a sintered body in which carbon particles having an average grain size of not more than 1 μm exist in a grain boundary of metal oxide particles in an amount of 0.05 to 3 wt %; and electrodes formed on at least two opposing surfaces of the sintered body.

In addition, according to the present invention, there is also provided a power resistor comprising:

a sintered body in which carbon particles having an average grain size of not more than 1 μm exist in a grain boundary of metal oxide particles in an amount of 0.05 to 0.8 wt %; and electrodes formed on at least two opposing surfaces of the sintered body.

Furthermore, according to the present invention, there is also provided a power circuit breaker comprising:

main switching means arranged on a current path;

auxiliary switching means connected to the current path parallelly with respect to the main switching means and turned on before the main switching means is turned on; and a closing resistor unit connected in series with the auxiliary switching means and incorporating a resistor having a sintered body and electrodes formed on two opposing surfaces of the sintered body, the sintered body having a structure in which carbon particles having an average grain size of not more than 1 μm exist in a grain boundary of metal oxide particles in an amount of 0.05 to 0.8 wt %.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

A metal oxide resistor according to the present invention will be described with reference to FIG. 2.

A metal oxide resistor 11 is constituted by a columnar sintered body 12, electrodes 13 formed on the upper and lower circular surfaces of the sintered body 12, and an insulating layer 14 formed on the outer peripheral surface of the sintered body 12.

The sintered body 12 has a structure in which carbon particles having an average grain size of 1 µm or less exist in the grain boundaries of metal oxide particles, and the amount of carbon particles is 0.05 to 3 wt %.

As the metal oxide, for example, aluminum oxide, zirconium oxide, titanium oxide, silicon oxide, magnesium oxide, iron oxide, zinc oxide, mullite ($3Al_2O_3 \cdot 2SiO_2$), zircon ($ZrO_2 \cdot SiO_2$), forsterite ($2MgO \cdot SiO_2$), steatite ($MgO \cdot SiO_2$), spinel ($2MgO \cdot Al_2O_3$), cordierite ($2MgO \cdot 2Al_2O_3 \cdot 5SiO_2$) can be used. As the metal oxide, a compound oxide (excluding spinel) represented by $M1_xM2_yO_z$ [wherein M1 represents Li, Na, Be, Mg, Cu, or Zn, and M2 represents Al, Ga, Ge, Ti, Zr, or V] or a mixture thereof can also be used. The average grain size of the metal oxide particles is preferably 5 µm or less, and more preferably 1 µm.

The sintered body 12 allows the coexistence of the particles of a carbide, nitride, oxycarbide, oxynitride, carbonitride, or oxycarbonitride at a ratio of 10 wt % or less of the metal oxide. As such compounds, for example, aluminum carbide, zirconium carbide, silicon carbide, aluminum nitride, aluminum oxycarbide, aluminum oxynitride, aluminum oxycarbonitride, or zirconium oxycarbonitride can be used.

When fine carbon particles having an average grain size of 1 µm or less exist in the grain boundaries of the metal oxide particles, the dispersion properties of the particles into the sintered body can be improved, and an excellent conductive path can be realized. The average grain size of the carbon particles is more preferably 0.01 to 0.5 µm.

The amount of carbon particles in the sintered body 12 is defined due to the following reason. When the amount of carbon particles is less than 0.05 wt %, it is difficult to obtain the conductive effect of the carbon. As a result, the electrical resistivity of the sintered body 12 becomes too high to make it difficult to obtain a resistor having a stable electrical resistance. On the other hand, when the amount of carbon particles exceeds 3 wt %, the electrical resistance of the resistor having the sintered body becomes too low. In addition, various characteristics such as the hardness, bending strength, and fracture toughness of the sintered body largely suffer.

The carbon particles preferably exist in an amorphous or glass state in the grain boundaries of the metal oxide particles. Particularly, it is preferable that the carbon particles exist in the amorphous state and converted into graphite near the grain boundary of the metal oxide particles.

Figures 3, 4:
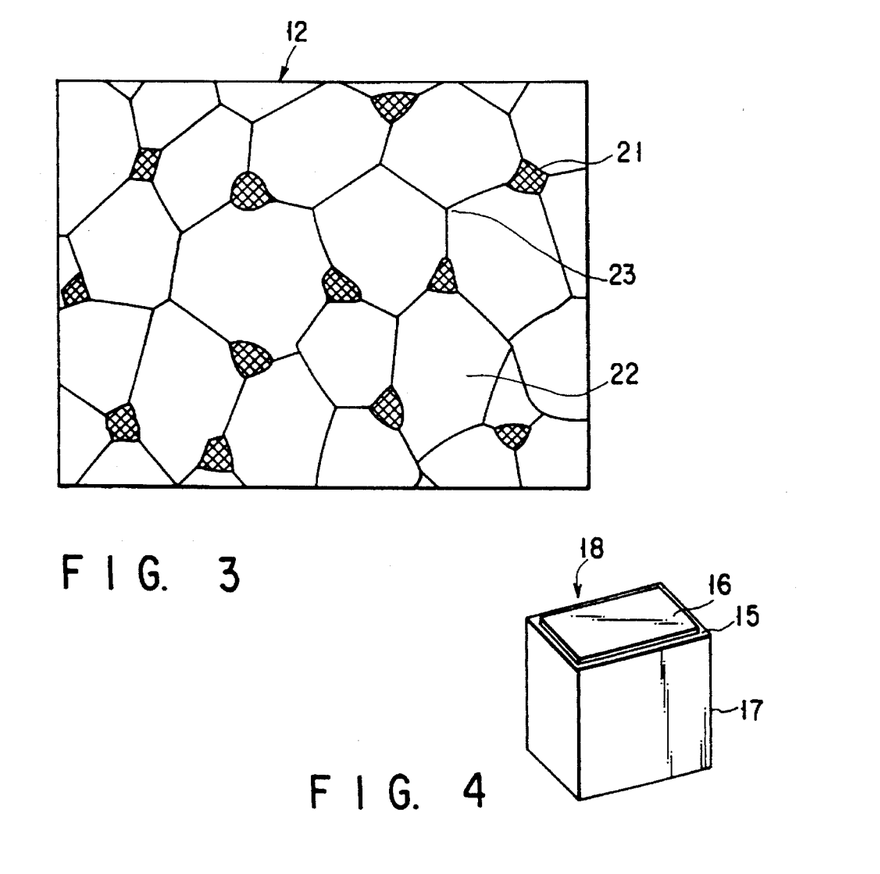
FIG. 3 is a sectional view showing the grain structure of a sintered body constituting the metal oxide resistor according to the present invention.
FIG. 4 is a perspective view showing another metal oxide resistor according to the present invention.

FIG. 3 is a sectional view schematically showing the section of the sintered body 12. As shown in FIG. 3, carbon particles 21 preferably exist at triple points 23 of the grain boundary of metal oxide particles 22. The carbon particles preferably exist at 30% or more the triple points of the grain boundary of the metal oxide particles. Since the carbon particles are sufficiently uniformly dispersed in such a sintered body, the resistance of the sintered body can be controlled to a desired value.

The electrodes 13 are formed of a metal such as aluminum and nickel, a carbide of Hf, Nb, Ta or Ti, or TiN.

The insulating layer 14 is formed of an insulating ceramic such as aluminum oxide, silicon oxide, borosilicate glass, or a resin such as polyimide.

The metal oxide resistor according to the present invention is manufactured by, e.g., the following method.

A carbon precursor consisting of an organic compound and a solvent are added to the metal oxide powder, and they are mixed and dried to prepare a mixed powder (first step). The mixed powder is molded to form a powder green compact (molded body) (second step). The powder green compact is heated and sintered in a vacuum, an inert gas such as He, Ne, At, Kr, and Xe, or a non-oxidizing gas such as $H_2$ gas and $N_2$ gas at a temperature of 1,300° to 1,800° C., thereby preparing the sintered body, in which carbon particles having an average grain size of 1 µm or less exist in the grain boundaries of self-sintered metal oxide particles in an amount within a range of 0.5 to 3 wt % (third step).

The two major surfaces of the sintered body are polished, and the electrodes are formed by sputtering, frame spraying, or baking. Thereafter, the insulating layer is formed on the outer peripheral surface of the sintered body by baking, frame spraying, or coating and drying, thereby manufacturing the metal oxide resistor.

The metal oxide powder in the mixed powder preferably has an average grain size of 3 μm or less. This is because a metal oxide powder having an average grain size of more than 3 μm may have poor self-sintering properties.

The carbon precursor in the mixed powder is a substance serving as a carbon source which exist as carbon in the sintered body after the third step. A very small portion of the carbon precursor serves as a substance for converting a portion of the metal in the metal oxide powder into a carbide or oxycarbide. As the carbon precursor, for example, an organic compound such as a resol-based phenolic resin, methyl cellulose, polyvinyl butyral, an acrylic copolymer, polyvinylidene chloride, an acrylonitrile copolymer, polyurethane, polyvinyl pyrrolidone, starch, a polyamide, and paraffin is used. Of these carbon precursors, especially polyvinyl pyrrolidone is preferably used because the amount of carbon in the sintered body obtained in the third step can be easily controlled.

After drying in the first step, or after the second step, a heat treatment in the vacuum or inert gas at 500° to 1,000° C. can be performed. With this heat treatment, the carbon precursor can be converted into amorphous carbon or glass-like carbon before the third step.

The reason why the sintering temperature is defined within the above range in the third step is as follows. At a sintering temperature less than 1,300° C., a dense sintered body can hardly be obtained, and the strength of the sintered body may be lowered. At a sintering temperature more than 1,800° C., the carbon particles in the sintered body become larger to have an average grain size more than 1.0 μm.

The above-described metal oxide resistor according to the present invention has a sintered body in which carbon particles having an average grain size of 1 μm or less exist in the grain boundaries of metal oxide particles in an amount of 0.05 to 3 wt %. The metal oxide particles act as an insulator, and the carbon particles act as a conductor. In the sintered body having this structure, voids are rarely formed, a dense structure is realized, and the fine carbon particles are uniformly dispersed. As a result, even when the resistor having the sintered body is exposed at a high temperature, oxidation of the carbon particles serving as a conductor is prevented, thereby reducing variations in resistance with time. In addition, since the fine carbon particles are uniformly dispersed in the sintered body, a resistor having a desired resistance can be realized. Furthermore, with the sintered body having a dense structure, a resistor having a high strength can be realized.

Particularly, when the carbon particles exist at the triple points of the grain boundary of the metal oxide particles, as shown in FIG. 3, and the carbon particles exist at 30% or more all the triple points, the carbon particles can be more uniformly dispersed in the sintered body. As a result, a resistor stably having a desired resistance can be realized.

Figure 2:
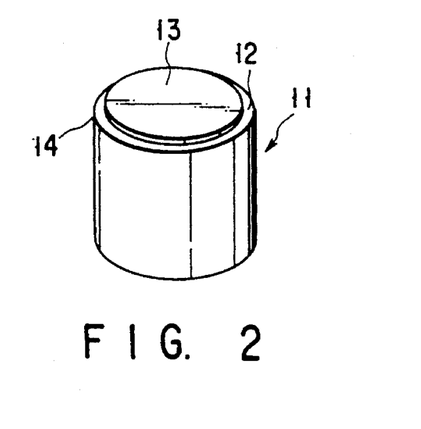
FIG. 2 is a perspective view showing a metal oxide resistor according to the present invention.

The structure of the metal oxide resistor according to the present invention is not limited to the columnar structure shown in FIG. 2. For example, a metal oxide resistor 18 may be constituted by a rectangular shaped sintered body 15, electrodes 16 formed on the upper and lower rectangular surfaces of the sintered body 15, and an insulating layer 17 formed on the side surfaces of the sintered body 15, as shown in FIG. 4.

A power resistor according to the present invention will be described below in detail with reference to FIGS. 5 and 6.

Figure 5:
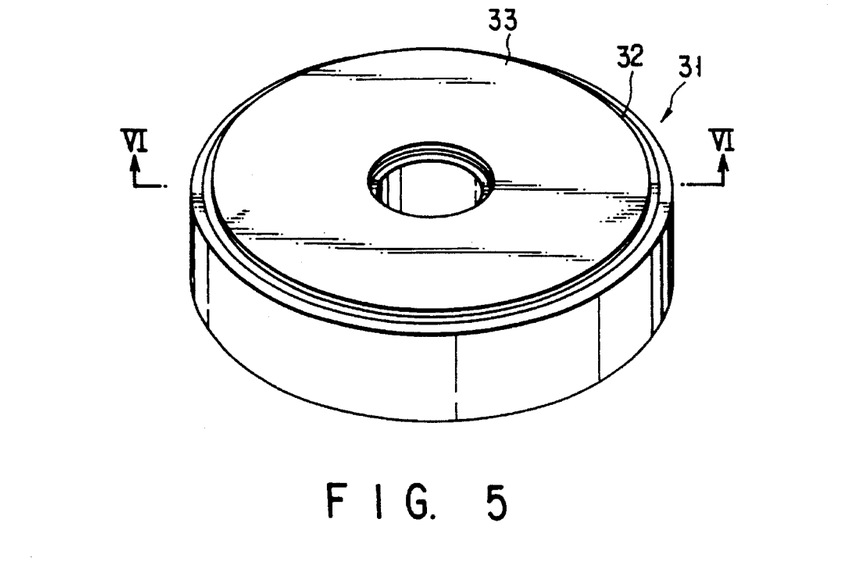
FIG. 5 is a perspective view showing a power resistor according to the present invention.
Figure 6:
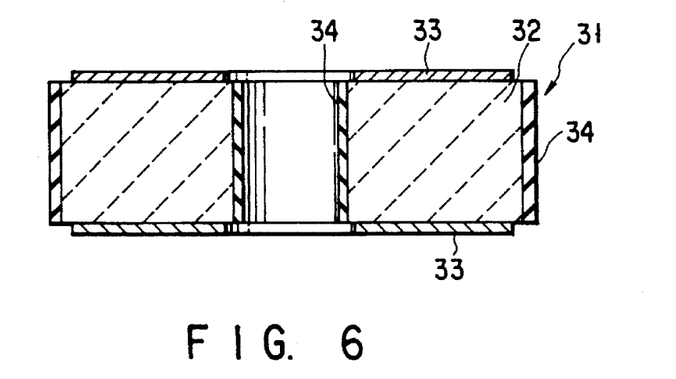
FIG. 6 is a sectional view of the power resister taken along a line VI—VI in FIG. 5.

A power resistor 31 is constituted by an annular sintered body 32, electrodes 33 formed on the upper and lower annular surfaces of the sintered body 32, and insulating layers 34 formed on the outer and inner peripheral surfaces of the sintered body 32, as shown in FIGS. 5 and 6.

The sintered body 32 has a structure in which carbon particles having an average grain size of 1 μm or less exist in the grain boundaries of metal oxide particles in an amount of 0.05 to 0.8 wt %.

As the metal oxide, the same materials as those in the above description of the metal oxide resistor can be used. Particularly, as the metal oxide, aluminum oxide, magnesium oxide, spinel ($2MgO.Al_2O_3$), cordierite ($2MgO.2Al_2O_3.5SiO_2$), a compound oxide (excluding spinel) represented by $M1_xM2_yO_z$ [wherein M1 represents Li, Na, Be, Mg, Cu, or Zn, and M2 represents Al, Ga, Ge, Ti, Zr, or V], or a mixture thereof is preferably used. Of these materials, aluminum oxide is preferably used because of its high strength and hardness and excellent chemical stability, heat resistance, and energy breakdown. The average grain size of the metal oxide particles is preferably 5 μm or less, and more preferably 1 μm.

As in the above description of the metal oxide resistor, the sintered body 32 allows the coexistence of the particles of a carbide, nitride, oxycarbide, oxynitride, carbonitride, or oxycarbonitride at a ratio of 10 wt % or less of the metal oxide.

When the carbon particles have a small average grain size of 1 μm or less, the dispersion properties of the particles into the sintered body can be improved, and an excellent conductive path can be realized. The average grain size of the carbon particles is more preferably 0.001 to 0.1 μm.

The amount of carbon particles in the sintered body 32 is defined due to the following reason. When the amount of carbon particles is less than 0.05 wt %, it is difficult to obtain the conductive effect of the carbon. As a result, the electrical resistivity of the sintered body 32 becomes too high to make it difficult to obtain a resistor having a stable electrical resistance. On the other hand, when the amount of carbon particles exceeds 0.8 wt %, the electrical resistance becomes too low to make the power resistor unusable. In addition, various characteristics such as the hardness, bending strength, and fracture toughness of the sintered body are largely degraded.

The carbon particles preferably exist in an amorphous or glass state in the sintered body. Particularly, it is preferable that the carbon particles exist in the amorphous state and converted into graphite near the grain boundary of the metal oxide particles such as aluminum oxide.

As shown in FIG. 3, the carbon particles preferably exist at the triple points of the grain boundary of the metal oxide particles. The carbon particles preferably exist at 30% or more the triple points of the grain boundary of the metal oxide particles. Since the carbon particles are sufficiently uniformly dispersed in such a sintered body, the resistance can be controlled to a desired value. In addition, a resistor capable of keeping a good resistance stability upon application of an electrical energy can be realized.

The electrodes 33 are formed of a metal such as aluminum and nickel, a carbide of Hf, Nb, Ta or Ti, or TiN.

The insulating layers 34 are provided to prevent a creepage discharge generated by the peripheral surfaces of the sintered body 32. The insulating layers 34 are preferably formed of an insulating ceramic such as aluminum oxide, silicon oxide, borosilicate glass, or a resin such as a polyimide.

The power resistor according to the present invention is manufactured by the same method as that for the metal oxide resistor. However, the upper limit value of the amount of carbon particles dispersed in the sintered body constituting the power resistor is set to 0.8 wt %. Therefore, a mixed powder containing a small amount of carbon precursor is prepared in the first step.

The above-described power resistor according to the present invention has a sintered body in which carbon particles having an average grain size of 1 μm or less exist in the grain boundaries of metal oxide particles in an amount of 0.05 to 0.8 wt %. The metal oxide particles act as an insulator, and the carbon particles act as a conductor. In the sintered body having this structure, voids are rarely formed, a dense structure is realized, and a predetermined amount of fine carbon particles are uniformly dispersed. With the sintered body having the dense structure, the resistor has a large heat capacity per unit volume, and an increase in temperature in accordance with heat generation caused by surge absorption is suppressed upon application of an electrical energy. Oxidation of the carbon particles serving as the conductor is also reduced. In addition, because of the carbon particles existing in the grain boundaries of the metal oxide particles, even when the sintered body is exposed at a high temperature, oxidation of the carbon particles as the conductor is reduced. As a result, a power resistor for reducing variations in resistance with time can be realized. Furthermore, since fine carbon particles are uniformly dispersed in the sintered body, a power resistor having a desired resistance can be realized.

In the sintered body having the carbon particles existing in the amorphous or glass state crystallographically and converted into graphite near the grain boundary of the metal oxide particles, the carbon particles are uniformly dispersed to further improve the denseness of the sintered body. For this reason, in the power resistor having the sintered body, the heat capacity per unit volume is further increased, and an increase in temperature in accordance with heat generation caused by surge absorption upon application Of an electrical energy is remarkably suppressed. In this power resistor, oxidation of the carbon particles, and a stress acting in the sintered body due to a difference in thermal expansion between the metal oxide and the carbon particles can be decreased.

Especially, when the carbon particles exist at the triple points of the grain boundary of the metal oxide particles, as shown in FIG. 3, and the carbon particles exist at 30% or more all the triple points, the carbon particles can be more uniformly dispersed in the sintered body. As a result, a power resistor stably having a desired resistance, in which oxidation of the carbon particles upon application of an electrical energy and a stress acting in the sintered body are reduced, can be realized.

When the electrodes are formed of a carbide of a metal selected from the group consisting of Hf, Nb, Ta, and Ti, or TiN, the physical adhesion of the electrodes to the sintered body can be enhanced. At the same time, the electrical contact properties of the electrodes with respect to the carbon particles in the sintered body can be improved.

Figure 7:
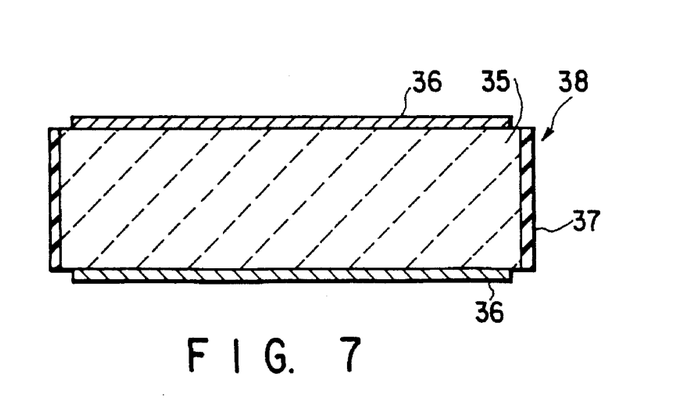
FIG. 7 is a sectional view showing another form of the power resistor according to the present invention.

The structure of the power resistor according to the present invention is not limited to the annular structure. For example, as shown in FIG. 7, a power resistor 38 may be constituted by a disk-like sintered body 35, electrodes 36 formed on the upper and lower circular surfaces of the sintered body 35, and an insulating layer 37 formed on the outer peripheral surface of the sintered body 35.

The power resistor according to the present invention can be applied to a closing resistor of a power circuit breaker (to be described later), or a fixed resistor, variable resistor, or resistor array used in a high-voltage unit or charge/discharge unit of a bulk capacitor.

A power circuit breaker according to the present invention will be described below with reference to FIGS. 8 and 9.

Figure 8:
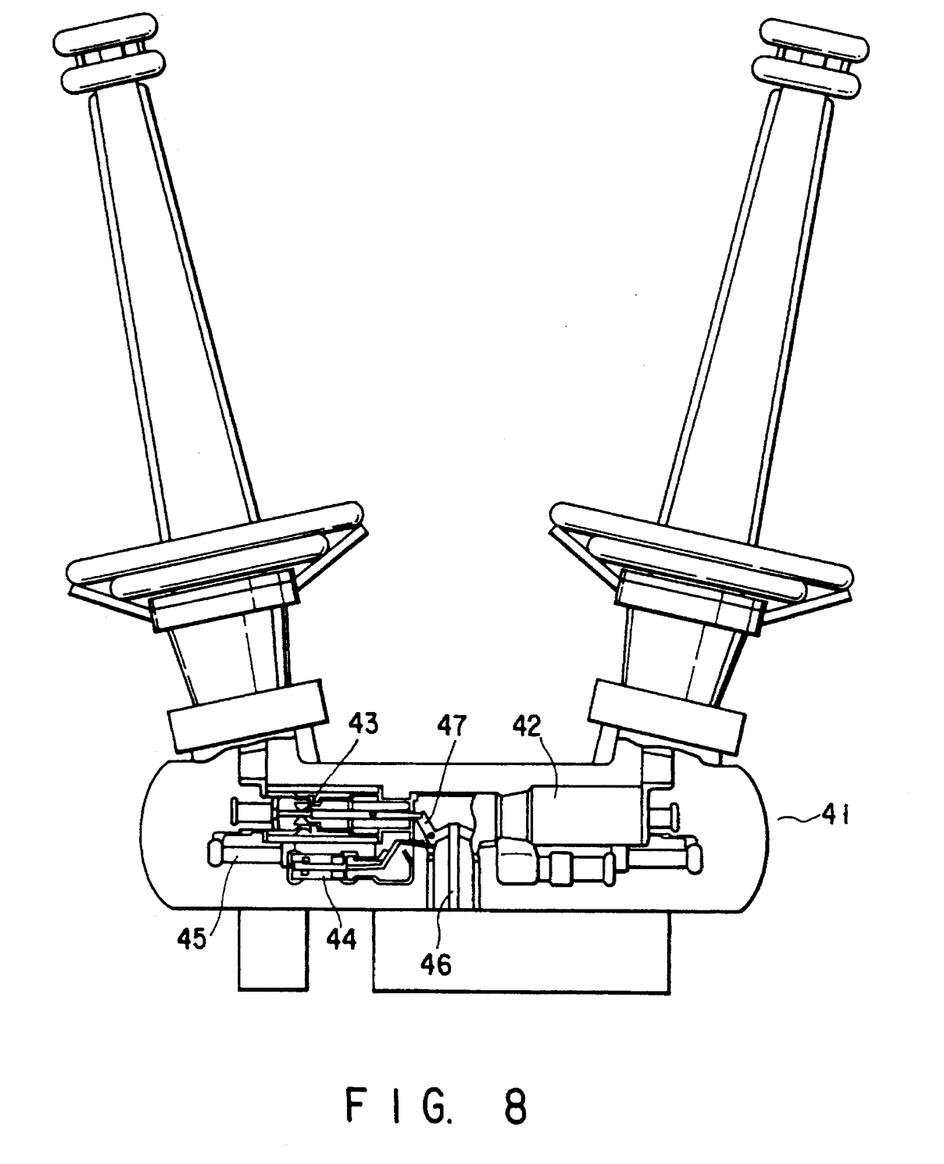
FIG. 8 is a view showing the arrangement of a power circuit breaker according to the present invention.

FIG. 8 is a view showing the arrangement of a circuit breaker according to the present invention. FIG. 9 is a perspective view showing a closing resistor. A circuit breaker 41 includes a main connection point 43 arranged in an arc extinguishing chamber 42 and connected to a current path. An auxiliary connection point 44 is connected to the current path parallelly with respect to the main connection point 43. A closing resistor unit 45 is connected in series with the auxiliary connection point 44. An insulating rod 46 which is vertically moved is connected to a switch 47 which is tilted.

In the power circuit breaker with the above arrangement, when the insulating rod 46 is driven upward, the switch 47 is tilted to turn on the auxiliary connection point 44 before the main connection point 43 is turned on. At this time, since the closing resistor unit 45 is connected in series with the auxiliary connection point 44, the voltage of a current flowing through the current path interposed with the auxiliary connection point 44 can be dropped to that of the closing resistor unit 45. As a result, an arc can be prevented from being generated in the ON state of the auxiliary connection point 44. In addition, a current flows in a current path interposed with the closing resistor unit 45 and the auxiliary connection point 44 immediately before the main connection point 43 is turned on, and no current flows in a current path interposed with the main connection point 43. For this reason, no high voltage is applied to the main connection point 43 when the main connection point 43 is turned on. As a result, an arc can be prevented from being generated in the ON state of the main connection point 43.

Figure 9:
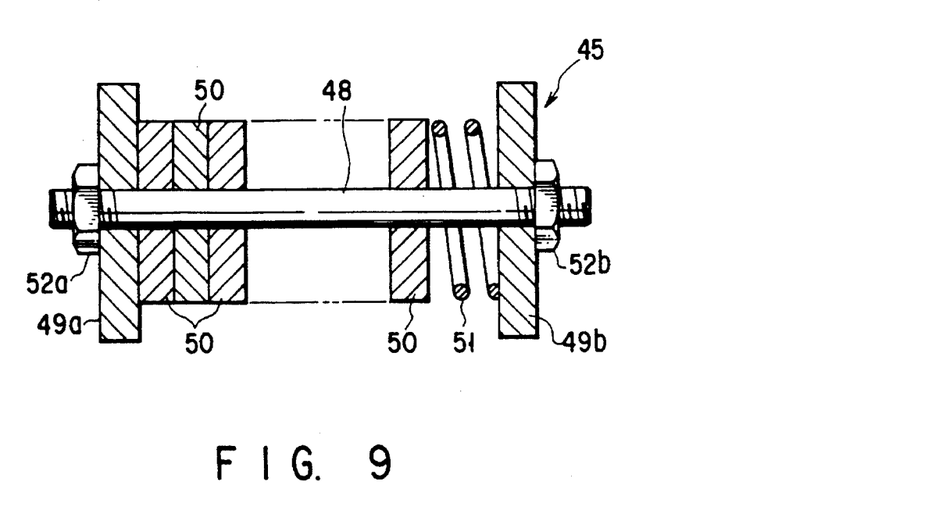
FIG. 9 is a view showing the arrangement of a closing resistor unit as a constituent element of the power circuit breaker in FIG. 8.

The closing resistor unit 45 is mainly constituted by an insulating support shaft 48, a pair of insulating support plates 49a and 49b, a plurality of hollow cylindrical resistors 50, and an elastic body 51, as shown in FIG. 9. The pair of insulating support plates 49a and 49b are fitted on the support shaft 48. The plurality of hollow cylindrical resistors 50 are fitted on the support shaft 48 portion located between the insulating support plates 49a and 49b. The elastic body 51 is disposed between the plurality of resistors 50 and the support plate 49a located at one end (right side). At the same time, the elastic body 51 is fitted on the insulating support shaft 48. The elastic body 51 applies an elastic force to the plurality of resistors 50 to stack them around the support shaft 48. Nuts 52a and 52b are threadably engaged with both the ends of the insulating support shaft 48, respectively. The nuts 52a and 52b are used for pressing the elastic body 51 arranged between the insulating support plates 49a and 49b. The insulating support shaft 48 is made of an organic material to have a high strength, a light weight, and good workability. The temperature of a closing resistor generally rises during absorption of a switching surge. For this reason, the strength of the support shaft made of the organic material having a low heat resistance cannot easily be maintained high. However, since a closing resistor having a composition (to be described later) has a large heat capacity, an increase in temperature of the resistor during absorption of a switching surge can be suppressed to a certain temperature or less. As a result, a support shaft made of the organic material can be used. In addition, as the heat capacity of a closing resistor is larger, the volume of the closing resistor can be decreased.

Each of the resistors (power resistors) 50 incorporated in the closing resistor unit 45 is constituted by the annular sintered body 32, the electrodes 33 formed on the upper and lower surfaces of the sintered body 32, and insulating layers 34 coated on the outer and inner peripheral surfaces of the sintered body 32, as shown in FIGS. 5 and 6. In the sintered body 32, the carbon particles having an average grain size of 1 μm or less exist in the grain boundaries of metal oxide particles in an amount of 0.05 to 0.8 wt %.

As described above, the power circuit breaker according to the present invention includes the sintered body with the above-mentioned structure and has the closing resistor unit incorporating a resistor having a large heat capacity per unit volume and a desired resistance whose variations with time is small. This closing resistance unit has a large breaking capacity, and the volume can be decreased as compared to a closing resistor unit incorporating a conventional carbon dispersion ceramic resistor, thereby ensuring stabler breaking performance. Therefore, a compact and high-performance power circuit breaker having the closing resistor unit can be realized.

The preferable examples of the present invention will be described below in detail.

EXAMPLES 1–10

Various solvents shown in Table 1 were added, together with alumina balls, to 500 g of a commercially available aluminum oxide powder having an average grain size of 1 μm as a metal oxide. They were mixed for 24 hours, thereby preparing first mixtures shown in Table 1.

Various carbon precursors and solvents were added and mixed for 4 hours to prepare second mixtures shown in Table 1.

After 250 g of each second mixture were added to the corresponding first mixture, they were mixed for four hours and dried, thereby preparing ten types of mixed powders. Each mixed powder was pressed and molded at a pressure of 1000 kg/cm$^2$ to form a disk-like powder green compact. The powder green compact was heat-treated in an argon atmosphere at 1,600° C. for two hours to perform carbon-conversion of the carbon precursor and sintering, thereby manufacturing ten types of sintered bodies.

A borosilicate glass powder was coated on the outer peripheral surface of each sintered body and baked to form an insulating layer. The upper and lower surfaces of each sintered body were polished and washed. Thereafter, aluminum electrodes were formed on both the surfaces (circular surfaces) of each sintered body by flame spraying, thereby manufacturing ten types of cylindrical metal oxide resistors shown in FIG. 2.

COMPARATIVE EXAMPLE 1

After 5 g of a carbon black and 150 g of a clay were added to 500 g of an aluminum oxide powder as in Example 1, they were mixed in a ball mill for 30 hours. The resultant mixture was then molded as in Example 1 and sintered at 1,200° C. An insulating layer and aluminum electrodes were formed on the sintered body, thereby manufacturing a metal oxide resistor.

COMPARATIVE EXAMPLE 2

After 25 g of a carbon black and 150 g of a clay were added to 500 g of aluminum oxide powder as in Example 1, they were mixed in a ball mill for 30 hours. The resultant mixture was then molded as in Example 1 and sintered at 1,200° C. An insulating layer and aluminum electrodes were formed on the sintered body, thereby manufacturing a metal oxide resistor.

The sectional structures of the sintered bodies of the metal oxide resistors of Examples 1 to 10 and Comparative Examples 1 and 2 were observed by a high-resolution transmission electron microscope. As a result, all the sintered bodies of the resistors of Examples 1 to 10 were confirmed to have a structure in which the carbon particles existed in the grain boundaries of self-sintered aluminum oxide particles having an average grain size of 1 μm. Note that the sintered body of the resistor of Example 4 was confirmed to have a structure in which substantially only the carbon particles existed in the grain boundaries of the aluminum oxide particles. To the contrary, both the sintered bodies of the resistors in Comparative Examples 1 and 2 were confirmed to have a structure in which clay and carbon particles existed in the grain boundaries of the aluminum oxide particles having an average grain size of 3 μm, and voids were also formed in the grain boundaries, as shown in the schematic view in FIG. 1.

The amount and the average grain size of carbon dispersed in the sintered body of each of the metal oxide resistors of Examples 1 to 10 and Comparative Examples 1 and 2 were measured. The resultant values are described in Table 2. The amount of carbon in the sintered body was obtained by pulverizing the sintered body of the same rod and analyzing the powder by the high-frequency combustion heating infrared absorption method. The average grain size of carbon was measured by the high-resolution transmission electron microscope.

The bending strength, hardness, and fracture toughness of the sintered body of each of the resistors of Examples 1 to 10 and Comparative Examples 1 and 2 were measured. The resistivity and the rate of change in resistance of each of the resistors of Examples 1 to 10 and Comparative Examples 1 and 2 were measured. These resultant values are also described in Table 2. An accelerated test was performed, in which an operation for heating the resistor at a temperature of 180° C. and cooling it was repeated 1,000 times, thereby obtaining the rate of change in resistance in accordance with the following equation.

$$\text{Rate of change in resistance } (\%) = [(R-R_0)/R_0] \times 100$$

where R represents the resistivity of the tested resistor, and $R_0$ represents the initial resistivity. Note that the rate of change in resistance is preferably 10% or less.

TABLE 1

| | Composition | | | |
| --- | --- | --- | --- | --- |
| | First Mixture | | Second Mixture | |
| | Metal Oxide | Solvent | Carbon Precursor | Solvent (Residue) |
| Example | | | | |
| 1 | Al$_2$O$_3$ | Methanol | 2% Resol-Based Phenolic Resin | Methanol |
| 2 | Al$_2$O$_3$ | Methanol | 10% Methyl Cellulose | Methanol |
| 3 | Al$_2$O$_3$ | Methanol | 10% Polyvinyl Butyral | Methanol |
| 4 | Al$_2$O$_3$ | Methanol | 10% Acrylic Copolymer | Methanol |
| 5 | Al$_2$O$_3$ | Methyl Ethyl Ketone | 3% Polyvinyliden Chloricle, Acrylonitrile | Methyl Ethyl Ketone |

TABLE 1-continued

| | Composition | | | |
|---|---|---|---|---|
| | First Mixture | | Second Mixture | |
| | Metal Oxide | Solvent | Carbon Precursor | Solvent (Residue) |
| 6 | $Al_2O_3$ | Diethyl Formamide | Copolymer 5% Polyurethane | Diethyl Formamide |
| 7 | $Al_2O_3$ | Distilled water | 10% Polyvinyl Pyrrolidone | Distilled Water |
| 8 | $Al_2O_3$ | Distilled Water | 10% Starch | Distilled Water |
| 9 | $Al_2O_3$ | Phenol | 10% Polyamide | Phenol |
| 10 | $Al_2O_3$ | Hexane | 10% Paraffin | Hexane |

Comparative Example 1  500 g $Al_2O_3$ - 5 g Carbon Black - 150 g Clay
2  500 g $Al_2O_3$ - 25 g Carbon Black - 150 g Clay types of sintered bodies. Thereafter, an insulating layer and aluminum electrodes were formed as in Example 1, thereby manufacturing nine types of resistors.

The sectional structures of the sintered bodies of the metal oxide resistors of Examples 11 to 17 and Comparative Examples 3 and 4 were observed by the high-resolution transmission electron microscope. As a result, all the sintered bodies of the resistors of Examples 11 to 17 were confirmed to have a structure in which the carbon particles existed in the grain boundaries of aluminum oxide particles having an average grain size of 1 μm. Both the sintered bodies of the resistors of Comparative Examples 3 and 4 were confirmed to have a structure in which the carbon particles existed in the grain boundaries of aluminum oxide particles having an average grain size of 3 μm.

The amount and the average grain size of carbon dispersed in the sintered body of each of the metal oxide resistors of Examples 11 to 17 and Comparative Examples 3 and 4 were measured by the same method as in Example 1. The bending strength, hardness, and fracture toughness of the sintered body of each of the resistors of Examples 11 to 17 and Comparative Examples 3 and 4 were measured. The

TABLE 2

| | Amount of Carbon Particles wt % | Average Grain Size of Carbon Particles μm | Bending Strength kgf/mm$^2$ | Hardness Hv | Fracture Toughness MPam$^2$ | Resistivity Ωcm | Rate of change in Resistance % |
|---|---|---|---|---|---|---|---|
| Example 1 | 0.05 | 0.2 | 90 | 1900 | 3.2 | $1 \times 10^5$ | 8.7 |
| Example 2 | 0.2 | 0.2 | 95 | 1900 | 3.2 | $1 \times 10^4$ | 5.5 |
| Example 3 | 0.3 | 0.2 | 95 | 1900 | 3.2 | $1 \times 10^4$ | 4.6 |
| Example 4 | 0.7 | 0.3 | 105 | 2000 | 3.5 | $1 \times 10^2$ | 4.5 |
| Example 5 | 0.1 | 0.2 | 95 | 1900 | 3.2 | $1 \times 10^5$ | 5.1 |
| Example 6 | 0.8 | 0.3 | 105 | 2000 | 3.5 | $1 \times 10^2$ | 8.4 |
| Example 7 | 0.8 | 0.3 | 105 | 2000 | 3.5 | $1 \times 10^2$ | 8.3 |
| Example 8 | 0.5 | 0.3 | 95 | 1900 | 3.2 | $1 \times 10^3$ | 4.1 |
| Example 9 | 0.8 | 0.3 | 90 | 1900 | 3.2 | $1 \times 10^2$ | 8.5 |
| Example 10 | 0.6 | 0.3 | 100 | 1950 | 3.3 | $1 \times 10^3$ | 3.7 |
| Comparative Example 1 | 1.0 | 0.8 | 70 | 1750 | 3.0 | $1 \times 10^1$ | 27.0 |
| Comparative Example 2 | 5.0 | 0.8 | 50 | 1660 | 2.8 | $1 \times 10^0$ | 15.0 |

As is apparent from Table 2, each of the metal oxide resistors of Examples 1 to 10 has a more appropriate resistivity than those of the metal oxide resistors of Comparative Examples 1 and 2. The rate of change in resistance is also sufficiently small so these metal oxide resistors have a stable electrical resistance characteristic. In addition, the metal oxide resistors of Examples 1 to 10 are excellent in bending strength and fracture toughness as compared to the metal oxide resistors of Comparative Examples 1 and 2. Note that all the sintered bodies constituting the resistors of Examples 1 to 10 have a dense structure with a relative density of 93% or more.

EXAMPLES 11–17 AND COMPARATIVE EXAMPLES 3 & 4

Using a commercially available aluminum oxide powder having an average grain size of 1 μm, a carbon precursor of polyvinyl pyrrolidone, and distilled water, preparation of mixed powders and molding of powder green compacts were performed following the same procedures as in Example 1 except that the contents of polyvinyl pyrrolidone were set to amounts shown in Table 3. Each powder green compact was sintered in an atmosphere at a temperature for a period of time shown in Table 3, thereby preparing nine resistivity and the rate of change in resistance of each resistor were measured by the same method as in Example 1. These resultant values are described in Table 4.

TABLE 3

| | Content of Polyvinyl Pyrrolidone (g) | Sintering Atmosphere | Sintering Condition Temperature (°C.) | Time (hr) |
|---|---|---|---|---|
| Example 11 | 5.0 | Argon | 1600 | 2 |
| Example 12 | 10.0 | Argon | 1600 | 2 |
| Example 13 | 20.0 | Argon | 1600 | 2 |
| Example 14 | 10.0 | Nitrogen | 1600 | 2 |
| Example 15 | 10.0 | Vacuum | 1600 | 2 |
| Example 16 | 10.0 | Argon | 1500 | 2 |
| Example 17 | 10.0 | Argon | 1700 | 2 |
| Comparative Example 3 | 1.0 | Argon | 1600 | 2 |
| Comparative Example 4 | 100.0 | Argon | 1600 | 2 |

TABLE 4

|  | Amount of Carbon Particles wt % | Average Grain Size of Carbon Particles μm | Bending Strength kgf/mm² | Hardness Hv | Fracture Toughness MPam² | Resistivity Ωcm | Rate of Change in Resistance % |
|---|---|---|---|---|---|---|---|
| Example 11 | 0.16 | 0.2 | 95 | 1900 | 3.2 | $1 \times 10^5$ | 6.2 |
| Example 12 | 0.32 | 0.2 | 95 | 1900 | 3.2 | $1 \times 10^4$ | 2.1 |
| Example 13 | 0.64 | 0.3 | 100 | 1950 | 3.3 | $1 \times 10^3$ | 8.7 |
| Example 14 | 0.30 | 0.2 | 95 | 1900 | 3.2 | $1 \times 10^4$ | 2.7 |
| Example 15 | 0.25 | 0.2 | 95 | 1900 | 3.2 | $1 \times 10^5$ | 2.5 |
| Example 16 | 0.35 | 0.3 | 95 | 1900 | 3.2 | $1 \times 10^3$ | 4.3 |
| Example 17 | 0.30 | 0.2 | 95 | 1900 | 3.2 | $1 \times 10^4$ | 2.2 |
| Comparative Example 3 | 0.03 | 0.2 | 80 | 1800 | 3.0 | $1 \times 10^7$ | — |
| Comparative Example 4 | 3.20 | 0.3 | 50 | 1400 | 2.8 | $1 \times 10^1$ | 16.0 |

As is apparent from Table 4, the metal oxide resistors of Examples 11 to 17 each having a sintered body containing 0.05 to 3.0 wt % of carbon existing in the grain boundaries of the aluminum oxide particles have a resistivity more appropriate than those of the metal oxide resistors of Comparative Examples 3 and 4 whose amounts of carbon fall outside the above range. In all the resistors of Examples 11 to 17, the rate in change of resistance is also sufficiently small, and a stable electrical resistance characteristic is obtained. In addition, the metal oxide resistors of Examples 11 to 17 are also excellent in bending strength and fracture toughness as compared to the metal oxide resistors of Comparative Examples 3 and 4. Note that all the sintered bodies constituting the resistors of Examples 11 to 17 have a dense structure with a relative density of 93% or more.

EXAMPLES 18–29

Using metal oxides shown in Table 5, 12 types of metal oxide resistors were manufactured following the same procedures as in Example 1 except that the carbon precursor of polyvinyl pyrrolidone was mixed such that the amount of carbon existing in the grain boundaries of the metal oxide particles in a sintered body became 0.5 wt %, and distilled water was used as a solvent. The average grain size of the carbon particles dispersed in the sintered bodies of these resistors was 0.3 μm.

The bending strength, hardness, and fracture toughness of the sintered body of each of the metal oxide resistors of Examples 18 to 29, and the resistivity and the rate in change in resistance of each resistor were measured. The resultant values are also described in Table 5. In some sintered bodies, the carbon partially existed as a carbide on the surfaces of the metal oxide particles.

TABLE 5

|  | Metal Oxide | Bending Strength kgf/mm² | Hardness Hv | Resistivity Ωcm | Rate of change in Resistance % |
|---|---|---|---|---|---|
| Example 18 | Aluminum Oxide | 95 | 1950 | $1 \times 10^3$ | 4.0 |
| Example 19 | Silica | 50 | 1300 | $1 \times 10^3$ | 5.6 |
| Example 20 | Mullite | 60 | 1250 | $1 \times 10^3$ | 5.2 |
| Example 21 | Zinc Oxide | 45 | 900 | $1 \times 10^2$ | 4.8 |
| Example 22 | Zircon | 50 | 850 | $1 \times 10^3$ | 5.4 |
| Example 23 | Forsterite | 40 | 900 | $1 \times 10^2$ | 4.9 |
| Example 24 | Steatite | 35 | 650 | $1 \times 10^3$ | 5.5 |
| Example 25 | Spinel | 40 | 1100 | $1 \times 10^3$ | 4.5 |
| Example 26 | Cordierite | 20 | 850 | $1 \times 10^2$ | 4.0 |
| Example 27 | Lithia | 30 | 750 | $1 \times 10^2$ | 6.3 |
| Example 28 | Titania | 35 | 1400 | $1 \times 10^2$ | 4.8 |
| Example 29 | ZnAl₂O₄ | 40 | 1000 | $1 \times 10^3$ | 5.7 |

As is apparent from Table 5, all the metal oxide resistors of Examples 18 to 29 exhibit an appropriate resistivity, have a sufficiently small rate of change in resistance and a stable electrical resistance characteristic. They are also excellent in bending strength and fracture toughness. Particularly, when aluminum oxide was used as a metal oxide, a dense sintered body was obtained. Because of its high hardness and chemical stability, this resistor exhibited a good corrosion resistance against a gas enclosed in the resistor and the natural environment such as weather.

EXAMPLES 30–35

Predetermined amounts of various solvents and carbon precursors shown in Table 6 were added to an aluminum oxide powder having an average grain size of 0.2 μm, and they were mixed and pulverized using an alumina pot and alumina balls. Each resultant slurry was dried while being stirred in an alumina vessel, thereby preparing six types of mixed powders. Each mixed powder was placed in a graphite vessel and heat-treated in a nitrogen atmosphere at 900° C., thereby preparing a composite powder having the aluminum oxide powder covered with carbon. The compound powder was wet-mixed and pulverized using the alumina pot, the alumina balls, and methanol as a dispersion medium, and paraffin was added as a molding binder, thereby preparing a granulated powder. The granulated powder was molded into an annular body using a steel metal mold, and sintered in the nitrogen atmosphere at 1,500° C. for two hours, thereby preparing six types of sintered bodies.

A borosilicate glass powder was coated on the outer and inner peripheral surfaces of each sintered body and baked to form insulating layers. The upper and lower surfaces of the sintered body were ground to form a sintered body having an outer diameter of 120 mm, an inner diameter of 35 mm, and a height of 25 mm. Aluminum electrodes were formed on the upper and lower surfaces (annular surfaces) of each sintered body by flame spraying, thereby manufacturing six types of power resistors shown in FIGS. 5 and 6.

COMPARATIVE EXAMPLE 5

After 5 g of a carbon black and 150 g of a clay were added to 500 g of an aluminum oxide powder as in Example 1, they were mixed in a ball mill for 30 hours. The resultant mixture was then molded and sintered as in Example 30. Insulating layers and aluminum electrodes were formed on the sintered body, thereby manufacturing an annular power resistor.

The sectional structures of the sintered bodies constituting the power resistors of Examples 30 to 35 and Comparative Example 5 were observed by a high-resolution transmission electron microscope. As a result, all the sintered bodies of the resistors of Examples 30 to 35 were confirmed to have a structure in which the carbon particles existed in the grain boundaries of aluminum oxide particles having an average grain size of 1 μm. Note that sintered body of the resistor of Example 34 was confirmed to have a structure in which substantially only the carbon particles existed in the grain boundaries of the aluminum particles. From an electron diffraction pattern by the high-resolution transmission electron microscope, the sintered body constituting the resistor of Example 31 was confirmed to have a structure in which the carbon particles existing near the grain boundaries of the aluminum oxide particles were converted into graphite. From an image by the high-resolution transmission electron microscope, the sintered body constituting the resistor of Example 32 was confirmed to have a structure in which the carbon existed at 55% of the triple points of the aluminum oxide particles, and the carbon particles were converted into graphite. On the other hand, the sintered body of the resistor of Comparative Example 5 was confirmed to have a structure in which the clay and the carbon particles existed in the grain boundaries of the aluminum oxide particles having an average grain size of 3 μm, and voids were also formed, as shown in the schematic view in FIG. 1.

The amount and the average grain size of carbon dispersed in the sintered body of each of the resistors of Examples 30 to 35 and Comparative Example 5 were measured by the same method as in Example 1. These resultant values are described in Table 6.

The resistivity and the rate of change in resistance of each of the power resistors in Examples 30 to 35 and Comparative Example 5 were measured. These resultant values are also described in Table 6. An operation for applying an energy of 200 J/cm$^3$ to each resistor was repeated ten times at predetermined intervals taking the cooling time of the resistor into consideration, thereby obtaining the rate of change in resistance in accordance with the following equation.

Rate of change in resistance (%) = $[(R-R_0)/R0] \times 100$ where R represents the resistivity of the resistor after application of the energy, and $R_0$ represents the initial resistivity. Note that the rate of change in resistance is preferably 10% or less.

TABLE 6

|  | Solvent | Carbon Precursor | Amount of Carbon Particles wt % | Average Grain Size of Carbon Particles μm | Resistivity Ωcm | Rate of change in Resistance % |
| --- | --- | --- | --- | --- | --- | --- |
| Example 30 | Methanol | Polyvinyl Pyrrolidone | 0.7 | 0.3 | $2.9 \times 10^2$ | 5.7 |
| Example 31 | Methanol | Polyvinyl Pyrrolidone | 0.2 | 0.3 | $2.6 \times 10^3$ | 5.4 |
| Example 32 | Methanol | Polyvinyl Pyrrolidone | 0.2 | 0.2 | $2.5 \times 10^3$ | 5.2 |
| Example 33 | Methanol | Polyvinyl Pyrrolidone | 0.1 | 0.1 | $1.5 \times 10^4$ | 8.8 |
| Example 34 | Methanol | Methyl Cellulose | 0.3 | 0.9 | $9.2 \times 10^2$ | 5.5 |
| Example 35 | Distilled Water | Polyvinyl Alcholo | 0.5 | 0.9 | $5.1 \times 10^2$ | 5.3 |
| Comparative Example 5 | — | — | 1.0 | 1.5 | $1.0 \times 10^1$ | 17.0 |

As is apparent from Table 6, the power resistors of Examples 30 to 35 each having a sintered body containing 0.05 to 0.8 wt % of carbon particles existing in the grain boundaries of aluminum oxide particles have a resistivity on the order of $10^2$ to $10^4$ Ωcm, a sufficiently small rate of change in resistance, and an electrical resistance characteristic stabler than that of the power resistor of Comparative Example 5. Even when the carbon precursors and the solvents used for the power resistors in Examples 30 to 35 are changed, the same electrical resistance characteristic can be obtained.

Especially, the power resistor of Example 31 having a sintered body with a structure in which carbon particles are converted into graphite near the grain boundaries of the aluminum oxide particles has a smaller rate of change in resistance and a good resistance characteristic. The power resistor of Example 32 has a sintered body with a structure in which the carbon particles exist at 55% of the triple points of the aluminum oxide particles, and the carbon particles are converted into graphite near the grain boundaries of the aluminum oxide particles. This power resistor also has a smaller rate of change in resistance and a good resistance characteristic. The carbon particles converted into graphite near the grain boundaries are satisfactorily coupled with the grain boundaries of the aluminum oxide particles. Therefore, a power resistor having a small rate of change in resistance and maintaining a good stability upon application of an electrical energy can be realized.

Note that each of the power resistors of Examples 30 to 35 has a sintered body with a relative density of 93% or more, and has a large heat capacity of about 3 J/cm$^3$·deg.

EXAMPLES 36–38 AND COMPARATIVE EXAMPLE 6

First of all, 1 wt % (figured out as a solid component) of a methanol solution of polyvinyl pyrrolidone was added to an aluminum oxide powder having an average grain size of 0.2 μm. Thereafter, a composite powder having the aluminum oxide powder covered with carbon was prepared following the same procedures as in Example 30. After the resultant powder was mixed, pulverized, and granulated, it was formed into an annular molded body. Each such molded body was sintered in a nitrogen atmosphere at one of the temperatures shown in Table 7 for two hours, thereby forming four types of sintered bodies. Thereafter, insulating layers were formed on the outer and inner peripheral surfaces of each sintered body following the same procedures as in Example 30, and grinding and formation of aluminum electrodes were performed, thereby manufacturing four types of power resistors.

The sectional structures of the sintered bodies constituting the power resistors of Examples 36 to 38 and Comparative Example 6 were observed by a high-resolution transmission electron microscope. As a result, all the sintered bodies of the resistors of Examples 36 to 38 were confirmed to have a structure in which the carbon particles existed in the grain boundaries of aluminum oxide particles having an average grain size of 1 to 4 μm. The sintered body of the resistor of Comparative Example 6 was confirmed to have a structure in which the carbon particles existed in the grain boundaries of aluminum oxide particles having an average grain size of 7 μm.

The amount and the average grain size of the carbon particles in the sintered body constituting each of the resistor were measured by the same method as in Example 1. The resistivity and the rate of change in resistance of each resistor were measured by the same method as in Example 30. These resultant values are described in Table 7.

TABLE 7

| | Sintering Temperature °C. | Amount of Carbon wt % | Average Grain Size of Carbon Particles μm | Resistivity Ωcm | Rate of Change in Resistance % |
|---|---|---|---|---|---|
| Example 36 | 1400 | 0.3 | 0.2 | $8.5 \times 10^2$ | 5.5 |
| Example 37 | 1500 | 0.2 | 0.2 | $2.5 \times 10^3$ | 5.2 |
| Example 38 | 1600 | 0.2 | 0.9 | $7.3 \times 10^3$ | 8.3 |
| Comparative Example 6 | 1850 | 0.2 | 1.1 | $7.2 \times 10^5$ | 15.0 |

As is apparent from Table 7, each of the power resistors of Examples 36 to 38 having a sintered body in which the carbon particles in the grain boundaries of the aluminum oxide particles have an average grain size of 1 μm or less exhibits an appropriate resistivity and a smaller rate of change in resistance of 10% or less. To the contrary, in the sintered body of Comparative Example 6 obtained by sintering at 1,850° C., the size of the carbon particles exceeds 1.0 μm. For this reason, the carbon particles are hardly in contact with each other in the sintered body. As a result, the power resistor of Comparative Example 6 having this sintered body has a rate of change in resistance as large as 15.0%.

Note that each of the power resistors in Examples 36 to 38 has a sintered body having a relative density of 93% or more, and a large heat capacity of about 3 J/cm³·deg.

EXAMPLE 39

A power resistor was manufactured following the same procedures as in Example 30 except that carbon electrodes were formed on the upper and lower surfaces of an annular sintered body having the same structure as that of Example 32 by sputtering.

As for the electrical characteristic of the resistor of Example 39, the current-voltage characteristic were measured by the DC two-terminal method.

In addition, the sintered body (sintered body obtained in Example 32) of Example 39 was cut into a strip having a size of 22×4×2 mm and washed by acetone. Thereafter, aluminum films were formed on four surfaces of the strip-like sintered body by sputtering, and a conductor wire was connected to the aluminum film, thereby measuring the current-voltage characteristics of the sintered body by the DC four-terminal method.

Figure 10:
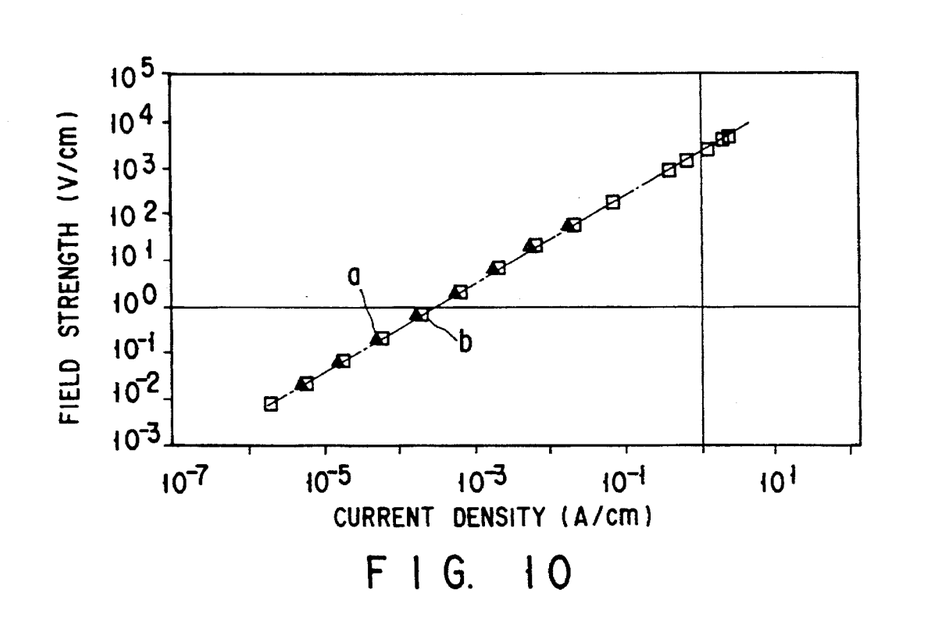
FIG. 10 is a graph showing the current-voltage characteristics of resistors obtained in Examples 46 and 32, which were measured according to the DC two-terminal method and the DC four-terminal method, respectively.

FIG. 10 is a graph in which a line b represents the current-voltage characteristics measured by the DC two-terminal method, and a line a represents the current-voltage characteristics measured by the DC four-terminal method. Referring to FIG. 10, the electrical characteristic of the resistor of Example 39 is almost the same as that measured by the DC four-terminal method. It is found that the electrodes and the sintered body are in good ohmic contact with each other. Although the same measurement operation was repeated several times, the current-voltage characteristics were not changed.

EXAMPLE 40

A power resistor was manufactured following the same procedure as in Example 30 except that electrodes consisting of HfC were formed by sputtering on the upper and lower surface of an annular sintered body having the same structure as that of Example 32.

EXAMPLE 41

A power resistor was manufactured following the same procedures as in Example 30 except that electrodes consisting of NbC were formed by sputtering on the upper and lower surface of an annular sintered body having the same structure as that of Example 32.

EXAMPLE 42

A power resistor was manufactured following the same procedures as in Example 30 except that electrodes consisting of TaC were formed by sputtering on the upper and lower surface of an annular sintered body having the same structure as that of Example 32.

EXAMPLE 43

A power resistor was manufactured following the same procedures as in Example 30 except that electrodes consisting of TiC were formed by sputtering on the upper and lower surface of an annular sintered body having the same structure as that of Example 32.

EXAMPLE 44

A power resistor was manufactured following the same procedures as in Example 30 except that electrodes consisting of TiN were formed by sputtering on the upper and lower surface of an annular sintered body having the same structure as that of Example 32.

As for the electrical characteristics of each of the power resistors of Examples 40 to 44, the current-voltage characteristics were measured by the DC two-terminal method. These characteristics were almost the same as those measured by the DC four-terminal method.

EXAMPLE 45

A magnesium oxide powder having an average grain size of 0.3 μm was wet-mixed in ethanol for 24 hours using a resin ball mill and a zirconia grinding medium. After the slurry was dried, 2 wt % of a trichloroethane solution of polyvinyl pyrrolidone were added, and they were mixed and granulated through a screen. The granulated powder was heat-treated in a nitrogen flow at 500° C., thereby preparing a composite powder having the magnesium oxide powder covered with carbon. Three wt % of an acrylate binder were added to this composite powder. The resultant mixture was molded using a metal mold at a pressure of 500 kg/cm² to form an annular molded body having an outer diameter of 148 mm, an inner diameter of 48 mm, and a height of 32 mm. After the binder in the molded body was removed in the nitrogen atmosphere at 500° C., the molded body was placed in an aluminum oxide vessel, and its temperature was increased at a rate of 100° C./hour, thereby sintering the molded body at a temperature of 1,400° C. in the air for 2 hours. A borosilicate glass powder was coated and baked on the outer and inner peripheral surfaces of the sintered body to form insulating layers thereon. The upper and lower surfaces of the sintered body were polished to form a sintered body having an outer diameter of 127 mm, an inner diameter of 41 mm, and a height of 25.4 mm. After the resultant sintered body was washed, aluminum electrodes were formed on the upper and lower surfaces (annular surfaces) by flame spraying, thereby manufacturing a power resistor.

The sectional structure of the sintered body constituting the power resistor of Example 45 was observed by a high-resolution transmission electron microscope. As a result, the sintered body of the resistor was confirmed to have a structure in which amorphous carbon particles existed in the grain boundaries of magnesium oxide particles having an average grain size of 2 μm.

The amount of carbon and the average grain size of the carbon particles in the sintered body constituting the resistor were measured by the same method as in Example 1. As a result, the amount of carbon in the sintered body was 0.4 wt %, and the average grain size of the carbon particles was 0.2 μm. The resistivity and the rate of change in resistance of the resistor were measured by the same method as in Example 30, and the heat capacity near 250° C. was measured by DSC. As a result, the resistivity was $10^3$ Ωcm, the rate of change in resistance was 4%, and the heat capacity was 3.3 J/cm³·deg.

EXAMPLE 46

A power resistor was manufactured following the same procedures as in Example 30 except that a water-soluble paste consisting of aluminum phosphate, a fine alumina powder, and a fine silica powder was coated on the outer and inner peripheral surfaces of a sintered body having the same structure as that of Example 32, and the resultant structure was dried at 150° C. for one hour to form insulating layers.

EXAMPLE 47

A resistor was manufactured following the same procedures as in Example 30 except that a polyimide precursor was coated on the outer and inner peripheral surfaces of a sintered body having the same structure as that of Example 32, and the resultant structure was heat-treated in a nitrogen atmosphere at 300° C. for one hour to form insulating layers converted into a polyimide.

(Evaluation of Circuit Breaker)

A predetermined number of resistor samples of each of the resistors of Examples 30 to 32, 34, 37, 44 to 47 and Comparative Example 5 were stacked as shown in FIG. 9, and the resultant resistors were supported by the elastic body 51 and the insulating support shaft 48 made of a resin and extending through the central portions of the resistors 50. Each of the resultant structures was accommodated in a cylindrical vessel to obtain the closing resistor unit 45. Each of the closing resistor units 45 was incorporated as shown in FIG. 8 to assemble ten types of power circuit breakers 41.

In each of the ten types of circuit breakers, an energy corresponding to the energy of the circuit breaker in out-of-step Relay conditions was applied to the closing resistor, and an energy (energy absorb capacity) which could be applied to the resistor while keeping its temperature rise below 80° C. was measured. In addition, the volume reduction ratio of each of the circuit breakers incorporating the power resistors of Examples 30 to 32, 34, 37, and 44 to 47 was measured with respect to that of the circuit breaker incorporating the power resistor of the Comparative Example 5. The obtained results are described in Table 8.

TABLE 8

| Circuit Breaker | Type of Power Resistor | Energy Absorb Capacity J/cm³ | Reduction Ratio of Volume of Circuit Breaker |
| --- | --- | --- | --- |
| No. 1 | Comparative Example 5 | 160 | — |
| No. 2 | Example 30 | 250 | 17 |
| No. 3 | Example 31 | 235 | 14 |
| No. 4 | Example 32 | 235 | 14 |
| No. 5 | Example 34 | 240 | 15 |
| No. 6 | Example 37 | 235 | 14 |
| No. 7 | Example 44 | 235 | 14 |
| No. 8 | Example 45 | 260 | 19 |
| No. 9 | Example 46 | 250 | 17 |
| No. 10 | Example 47 | 235 | 14 |

In addition, in order to examine the stability of breaking performance, an energy corresponding to the energy of a circuit breaker in out-of-step Relay conditions was applied 20 times to each of the circuit breakers Nos. 2 to 9 in Table 8, and the rate of change in resistance of each of the closing resistors was measured. As a result, in each of all the circuit breakers, the rate of change in resistance was 10% or less, and it was confirmed that the stability of the breaking performance was sufficiently high.

As described above, according to the present invention, there is provided a metal oxide resistor having a desired resistance whose change with time is small.

In addition, according to the present invention, there is provided a power resistor having a desired resistance whose change with time, particularly change with time by surge absorption is small, and a large heat capacity per unit volume. Therefore, a resistor much smaller than a conventional resistor can be manufactured. Accordingly, the size of a circuit breaker incorporating the resistor can be reduced. Other power equipments such as an NGR and a motor control resistor can also be size-reduced by applying this resistor.

Furthermore, according to the present invention, there is provided a compact and high-performance power circuit breaker having a closing resistor unit with a large breaking capacity and stable breaking performance.

Additional advantages and modifications will readily occur to those skilled in the art. Therefore, the invention in its broades aspects is not limited to the specific details, and representative devices, shown and described herein. Accordingly, various modifications may be made without departing from the spirit or scope of the general inventive concept as defined by the appended claims and their equivalents.

What is claimed is:

1. A metal oxide resistor comprising:
   a sintered body in which carbon particles having an average grain size of not more than 1 µm exist in a grain boundary of metal oxide particles in an amount of 0.05 to 3 wt %; and
   electrodes formed on at least two opposing surfaces of said sintered body.

2. A resistor according to claim 1, wherein said metal oxide is a material selected from the group consisting of aluminum oxide, zirconium oxide, titanium oxide, magnesium oxide, zinc oxide, mullite, zircon, forsterite, steatite, spinel, and cordierite.

3. A resistor according to claim 1, wherein said metal oxide particles have an average grain size of not more than 5 µm.

4. A resistor according to claim 1, wherein said carbon particles have an average grain size of 0.01 to 0.5 µm.

5. A power resistor comprising:
   a sintered body in which carbon particles having an average grain size of not more than 1 µm exist in a grain boundary of metal oxide particles in an amount of 0.05 to 0.8 wt %; and
   electrodes formed on at least two opposing surfaces of said sintered body.

6. A power resistor according to claim 5, wherein said metal oxide is aluminum oxide or a composite oxide containing aluminum.

7. A power resistor according to claim 5, wherein said metal oxide particles have an average grain size of not more than 5 µm.

8. A power resistor according to claim 5, wherein said carbon particles have an average grain size of 0.01 to 0.5 µm.

9. A power resistor according to claim 5, wherein said carbon particles exist in an amorphous or glass state in said grain boundary of said metal oxide particles.

10. A power resistor according to claim 5, wherein said carbon particles are converted into graphite near said grain boundary of said metal oxide particles.

11. A power resistor according to claim 5, wherein said carbon particles exist at triple points of said grain boundary of said metal oxide particles.

12. A power resistor according to claim 5, wherein said sintered body has a relative density of not less than 93%.

13. A power resistor according to claim 5, wherein said electrodes consist of one material selected from the group consisting of carbides of metals, Hf, Nb, Ta and Ti, and TiN.

14. A power resistor according to claim 5, wherein said sintered body has a disk-like shape, and said electrodes are formed on two circular surfaces of said sintered body.

15. A power resistor according to claim 5, wherein said sintered body has an annular disk-like shape, and said electrodes are formed on two annular surfaces of said sintered body.

16. A power resistor according to claim 5, wherein an outer peripheral surface of said sintered body excluding said electrodes is covered with an insulating layer.

17. A resistor according to claim 16, wherein said insulating layer consists of glass.

18. A power circuit breaker comprising:
   main switching means arranged on a current path;
   auxiliary switching means connected to said current path parallelly with respect to said main switching means and turned on before said main switching means is turned on; and
   a closing resistor unit connected in series with said auxiliary switching means and incorporating a resistor having a sintered body and electrodes formed on two opposing surfaces of said sintered body, said sintered body having a structure in which carbon particles having an average grain size of not more than 1 µm exist in a grain boundary of metal oxide particles in an amount of 0.05 to 0.8 wt %.

19. A breaker according to claim 18, wherein said metal oxide particles in said sintered body are aluminum oxide particles or composite oxide particles containing aluminum.

20. A breaker according to claim 18, wherein said metal oxide particles in said sintered body have an average grain size of not more than 5 µm.

21. A breaker according to claim 18, wherein said carbon particles in said sintered body have an average grain size of 0.01 to 0.5 µm.

22. A breaker according to claim 18, wherein said carbon particles in said sintered body exist in an amorphous or glass state near said grain boundary of said metal oxide particles.

23. A breaker according to claim 18, wherein said carbon particles in said sintered body are converted into graphite near said grain boundary of said metal oxide particles.

24. A breaker according to claim 18, wherein said carbon particles in said sintered body exist at triple points of said grain boundary of said metal oxide particles.

25. A breaker according to claim 18, wherein said sintered body has a relative density of not less than 93%.

26. A breaker according to claim 18, wherein said sintered body has a disk-like shape, and said electrodes are formed on two circular surfaces of said sintered body.

27. A breaker according to claim 18, wherein said sintered body has an annular disk-like shape, and said electrodes are formed on two annular surfaces of said sintered body.

28. A breaker according to claim 18, wherein said electrodes consist of one material selected from the group consisting of carbides of metals, Hf, Nb, Ta and Ti, and TiN.

29. A breaker according to claim 18, wherein an outer peripheral surface of said sintered body excluding said electrodes is covered with an insulating layer.

30. A breaker according to claim 29, wherein said insulating layer consists of glass.

* * * * *